May 25, 1965  M. A. SOUTHCOTT ETAL  3,184,796
APPARATUS FOR BENDING PLASTIC PIPE
Filed Jan. 28, 1963  3 Sheets-Sheet 1

INVENTORS
Marvin A. Southcott
BY Charles Lashinco, Jr.
Julian Caplan
attorney

May 25, 1965 M. A. SOUTHCOTT ETAL 3,184,796
APPARATUS FOR BENDING PLASTIC PIPE
Filed Jan. 28, 1963 3 Sheets-Sheet 2

INVENTORS
Marvin A. Southcott
BY Charles Lashinco, Jr.
Julian Caplan
attorney

INVENTORS
Marvin A. Southcott
BY Charles Lashinco, Jr.

United States Patent Office 3,184,796
Patented May 25, 1965

3,184,796
APPARATUS FOR BENDING PLASTIC PIPE
Marvin A. Southcott, 83 Arroyo Way, San Francisco, Calif., and Charles Lashinco, Jr., 1568 Todd St., Mountain View, Calif.
Filed Jan. 28, 1963, Ser. No. 254,205
8 Claims. (Cl. 18—19)

This invention relates to a new and improved apparatus for bending plastic pipe. At present, plastic pipe made of material such as polyethylene and polyvinyl and other materials is finding increasing use for many purposes. Electrical conduit, water and sewage pipes underground are two principal uses. Ordinarily, the manufacturers of the pipe provide fittings, such as elbows, of standard angles such as 90° and 45°. However, conditions of a particular job frequently require bending the pipe to other angles than those provided by standard fittings. The bending operation for plastic pipe requires application of heat to make the plastic more pliable prior to bending and accurate bending to the desired angle occasions considerable difficulty. The present apparatus is designed to facilitate heating and bending the pipe rapidly and accurately and without substantial reduction in wall thickness and overcomes the problems arising out of pre-existing methods and apparatus.

One principal feature of the invention is the provision of a heating chamber which is readily accessible to the user and which provides heating elements located relative to the pipe in such manner as to heat the same at the area to be bent. A timing switch is operated in the electrical heating circuit which can be adjusted to continue heating for the required time to make the plastic pliable, the length of time being subject to a number of variables of which the diameter of the pipe is a principal factor. Accurate heating of the pipe is important, in that insufficient heating will cause the pipe to break when bent and excessive heating will cause the pipe to lose a circular cross-section during the bending operation, to sag, or to have a non-uniform wall thickness.

A further feature of the invention is the provision of the bending form in close proximity to the heating chamber, so that the pipe may be transferred rapidly from the heating chamber to the bending form and the bending operation performed while the pipe is at the proper temperature. The present invention provides a bending form which is placed at the end of the heating chamber so that the operator need merely move the pipe longitudinally from the heating chamber to the table on which the form is mounted in a quick operation.

A still further feature of the invention is the adaptability of the device to a variety of sizes of pipe. Thus, the heating chamber has means incorporated therein to close off the gap at the ends of the chamber which occur when small diameter pipes are being bent, the closing of the gap being automatically achieved. The bending forms used in the bending operation are further changeable for various pipe sizes, the change being rapidly and conveniently accomplished.

Another feature of the invention is the fact that the apparatus is portable and may be moved to the job site. It will be understood that the angle to which the pipe is to be bent is frequently not determined until the installer reaches the site. Hence, it is important that the angle of bending be performed as a result of measurements made immediately prior to the bending operation.

A still further feature of the invention is the fact that spoilage of pipe is greatly reduced by the present invention. As has been mentioned, overheating and underheating of the pipe is undesirable, but methods used heretofore involved heating the pipe with a blow torch and other inexact methods and apparatus.

A further advantage of this invention is the fact that the wall thickness of the pipe after bending is not reduced to any appreciable extent. Ordinary elbows are fabricated by a pulling operation which stretches the pipe and tends to weaken the wall thickness.

Another feature of the invention is that a plurality of smaller size pipes may be heated simultaneously in the heating chamber and then withdrawn and bent one by one. The heat retention characteristics of the chamber are such as to make this mode of operation practical.

Other objects of the present invention will become apparent upon reading the following specification and referring to the accompanying drawings in which similar characters of reference represent corresponding parts in each of the several views.

Figure 1:
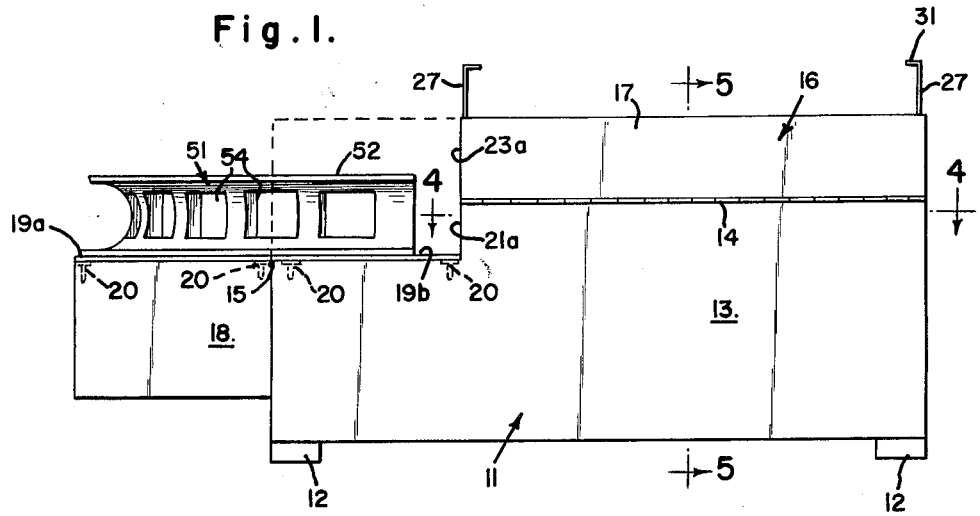
FIG. 1 is a front elevation of the machine.
Figure 2:
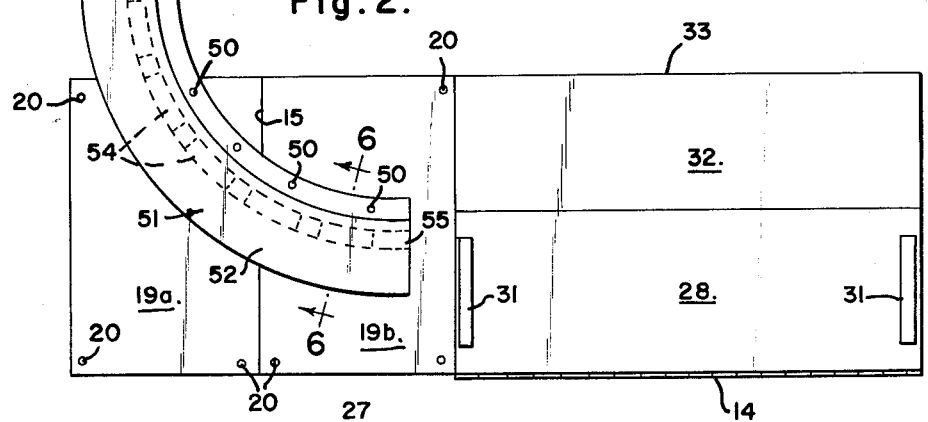
FIG. 2 is a top plan thereof.

The apparatus, which is the subject of this invention, comprises a frame 11 supported by legs 12 which may be placed on a bench or detachable leg so that the apparatus may be, if desired, transported from job to job in a truck. Casing 11 has a front 13 which encloses the front of the heating compartment of the apparatus and has at its upper edge adjacent said heating compartment a hinge 14 of the piano hinge type, to which is connected a top cover 16. A front panel 17 of cover 16 completes closing off the front of the heating compartment. Front panel 13 is cut away at the upper left-hand side of the machine as viewed from the front. Frame extension 18 is hinged at hinge 15 to the main frame 11 so that it may be folded from the position of use shown in solid lines in FIG. 1 to a closed position for storage. A top working surface is provided by two detachable plates 19a, 19b attached to extension 18 and frame 11 by studs 20. Prior to folding of the machine, plates 19a, 19b are removed and stored in the open top of the left-hand extension of frame 11. Access to a storage compartment is obtained through the left-hand end of the machine and closed by a door (not shown).

Figure 3:
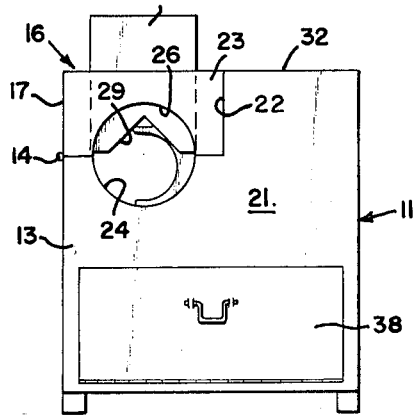
FIG. 3 is an end elevation as viewed from the right in FIG. 2.
Figure 4:
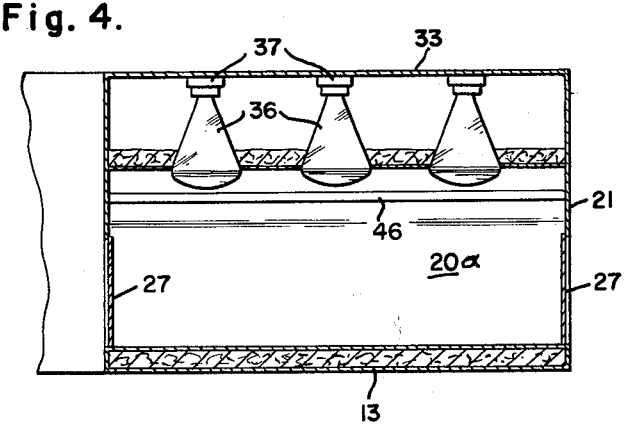
FIG. 4 is a horizontal sectional view taken substantially along the line 4—4 of FIG. 1.

Viewed from the right-hand side, as in FIG. 3, the side panel 21 is formed at its left-hand top corner with a cut-away 22 which is normally partially closed off by side 23 of cover 16. A semi-circular cut-out 24 is formed in the edge of panel 21 adjoining cut-away portion 22, the radius of the cut-out 24 being equal to that of the largest diameter pipe to be handled. A similar arcuate cut-out 26 is formed in side panel 23. To prevent unnecessary loss of heat through the openings provided by cut-outs 24, 26, a slide 27 slides through slots in top panel 28 of cover 16, slide 27 being formed at its lower edge with a V-shaped cut-out 29. In the position of use of cover 16, shown in FIG. 3, slide 27 descends until it rests upon the pipe held in the heating compartment and hence closes off a major part of the gap. Handle 31 on the top of the slide is used to raise and lower the slide when required.

Viewed from the left-hand side of FIG. 1, the left-hand panel 21–A of casing 11 is formed with an arcuate cut-out similar to cut-out 24 and the side panel 23–A of cover 16 is formed with a cut-out similar to 26. A slide 27 is installed in the left-hand end of the heating compartment, similar to that installed in the right-hand end.

Stationary cover portion 32, together with top 28, close off the entire top of the upper part of the heating compartment. Back 33 has recesses for timing control 34, controlling the timing of heating elements 36 installed in back 33 by means of sockets 37. A door 38 is hinged into the right-hand end 21 to give access to a storage compartment for extra parts. A horizontal partition 39 above drawer 38 closes off the bottom of the heating compartment 20.

Figure 5:
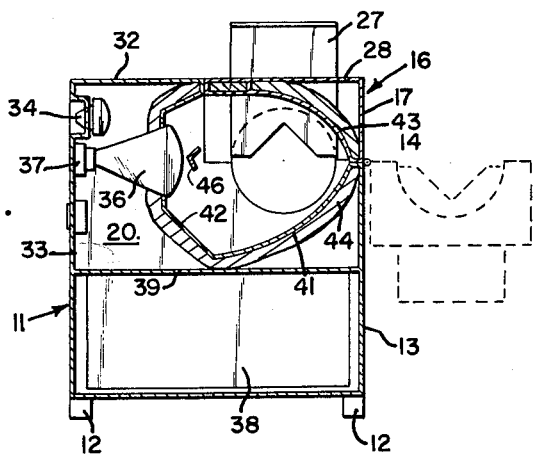
FIG. 5 is a vertical sectional view taken substantially along the line 5—5 of FIG. 1.

It will thus be seen that cover 16 may be opened from the full line position to the dotted line position shown in FIG. 5, to provide access to the interior for installation of the pipe to be heated. As the cover 16 is closed, the slides 27 slide down into position resting upon the top of the pipe. Several smaller pipes may be heated at the same time, the size of cut-outs 24 being great enough for such purpose.

To facilitate heating and conserve heating current, a bottom parabolic reflector 41 is installed in the interior of the heating compartment which is jointed at the back with a second reflector 42 through which the end of the heating lamp 36 is inserted. An upper parabolic reflector 43 is installed in cover 16 which joins with the upper end of reflector 42. Suitable heat insulation 44 surrounds the outside of the reflectors. Further, to prevent direct heat from the lamps 36 from overheating pipe in the heating chamber, an angle-shaped shield 46 extends parallel to the pipe in close proximity to the center line of lamps 36. Insulation 44 is sufficient so that heat is retained and one or more heated pipes remain pliable until withdrawn for the bending operation.

After the pipe has been heated, the pipe is slid lengthwise onto the plates 19a, 19b. A bending form 51 is interchangeably fastened on table plates 19 by studs 50, the form 51 being changeable for different pipe diameter sizes. In plan, form 51 is arcuate with an included angle of 90° with tangent short end extensions 55 at either end. The top and bottom surfaces 52, 53 are arcuate, having an arcuate length of 90°. The front edge of the form 51 has an arcuate concavity complementary to the diameter of the pipe to be bent so that the pipe will fit into the concavity and assume the angle of the form. Windows 54 are cut into the side for circulation of air to cool the pipe after it has been bent, it being understood that an air blower may be installed behind form 51 to force air through windows 54 and to accelerate the cooling.

Figure 6:
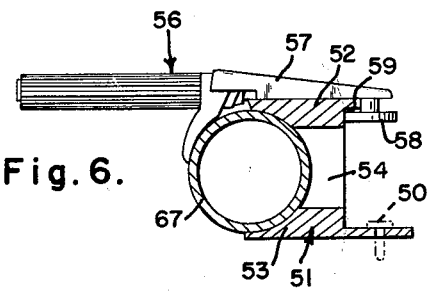
FIG. 6 is a transverse sectional view through the forming portion of the machine taken substantially along the line 6—6 of FIG. 2, with the tool which bends the pipe installed.
Figure 7:
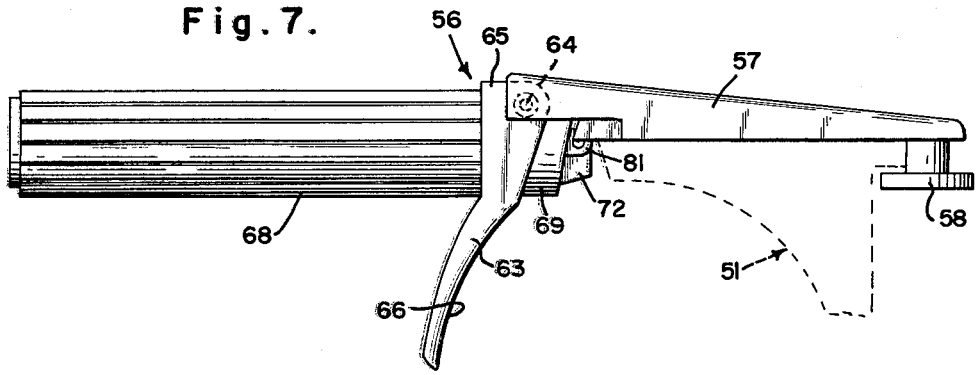
FIG. 7 is a side elevational view of the tool.
Figure 8:
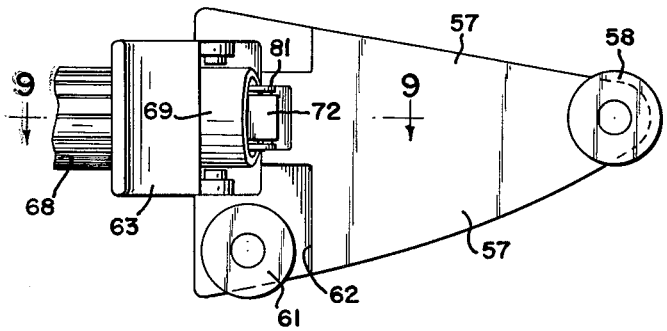
FIG. 8 is a plan thereof partially broken away.
Figure 9:
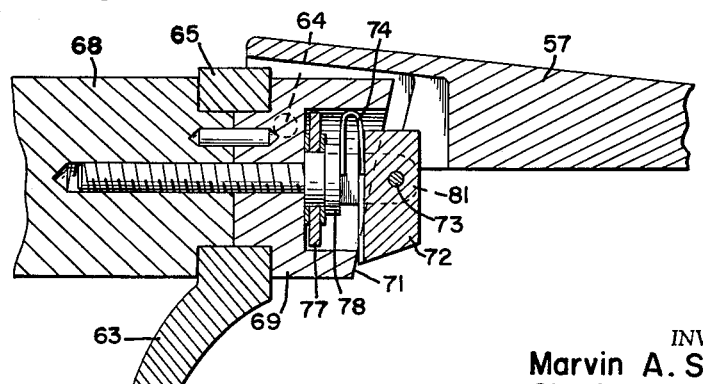
FIG. 9 is a sectional view taken substantially along the line 9—9 of FIG. 8.

A tool 56 is used in conjunction with the form to perform the bending operation. Such a tool has a top bar 57 resting upon top surface 52 in the normal position of use, and carrying at its outer end a circular stud 58 which fits under a rabbet 59 on the underside of top 52 to hold the tool in place. A second stud 61 is positioned in a recess 62 in a rear corner of member 57 and engages the top and forward edge of member 52. Studs 58 and 61 thus cooperate to hold the tool 56 in place. Curved finger 63 is pivoted by means of pivot 64 to member 57. The concave surface 66 of finger 63 engages the surface of pipe 67 positioned in form 51, as best shown in FIG. 6, and forces the pipe into conformity to the shape of the concave surface of the underside of member 52 and the upper side of member 53. Finger 63 is rotatively mounted by means of its collar 65 around handle 68. Handle 68 carries a hollow cam 69 on its forward end, the cam surface 71 thereof being slanted. Inside cam 69 is stirrup 76 having its base 77 retained by screw 78 but rotatable around screw 78 relative to cam 69, with washers 79 assuring relative rotation. A dog 72 is pivoted by means of pivot 73 to arms 81 projecting from base 77 and is biased outwardly as viewed in FIG. 9 by spring 74 interposed between base 77 and dog 72. Dog 72 locks against the edge of member 52 to hold the tool in place relative to form 51 when handle 68 and cam 69 are twisted so that the high portion of cam surface 71 engages dog 72. Locking of dog 72 holds tool 56 stationary at the desired bent position of the pipe while the pipe cools.

Although the foregoing invention has been described in some detail, by way of illustration and example for purposes of clarity of understanding, it is understood that certain changes and modifications may be practiced within the spirit of the invention and scope of the appended claims.

What is claimed is:

1. Apparatus for bending tubular material flexible when heated, comprising a frame, a heating cabinet on said frame, support means on said frame for supporting pipe in said cabinet, a cover for said cabinet, means mounting said cover on said cabinet, slides mounted for movement in said cover, said cover and cabinet formed with cut away portions to accommodate pipe of different sizes, said slides at least partially closing off the cut away portions of said cover and cabinet against escape of heat when small pipe is supported on said support means, heating elements in said cabinet positioned to direct heat upon pipe held in said support means, a curved form mounted on said frame adjacent said heating cabinet and shaped to receive pipe, and a tool cooperable with said form to bend into a curved shape pipe made flexible by heating in said cabinet.

2. Apparatus for bending thermoplastic tubes comprising an elongated cabinet to accommodate a length of pipe, said cabinet open at both ends and formed at each end opening with a supporting surface for a length of pipe, said cabinet formed with an opening above said support means to provide access to the interior of said cabinet, a cover for said cabinet to close off said opening, slides slidable in said cover at each end opening transverse to the direction of pipe in said cabinet and formed with cut-outs in their normally bottom edges, said slides fitting with said cut-outs contacting said pipe when said cover is closed to at least partially close off said end openings against escape of heat, and heating elements inside said cabinet positioned to direct heat upon pipe held in said support means.

3. Apparatus according to claim 2, which further comprises reflectors mounted in said cabinet and in said cover to concentrate heat on said pipe.

4. Apparatus for bending thermoplastic tubes comprising a table, a form detachably mounted on said table, said form curved in an arc having its center on an axis transverse to said table, said form having a top surface parallel to said table, said form being uniformly concave about an edge disposed generally transverse to said top surface, and a tool cooperable with said form and movable about an arc concentric with said axis, said tool having a curved foot facing the concavity of said form to force heated pipe into the concavity to assume a shape curved around at least a portion of said arc.

5. Apparatus according to claim 4, which further comprises latch means on said tool to secure said tool at a fixed position on said form.

6. Apparatus according to claim 4, in which said form is cut away in cooling windows communicating with said concavity to accelerate cooling of heated pipe bent in said form.

7. According to claim 4, which further comprises a handle on said tool for manually controlled, arcuate movement of said tool around said arc.

8. Apparatus according to claim 7, which further comprises cooperating slide means on said form and tool to facilitate sliding movement of said tool around said form when said handle is moved manually.

References Cited by the Examiner

UNITED STATES PATENTS

| | | | |
|---|---|---|---|
| 735,307 | 8/03 | Smith | 65—281 XR |
| 1,552,367 | 9/25 | Watrol | 153—4 |
| 2,208,958 | 7/40 | Brown et al. | 65—281 |
| 2,313,698 | 3/43 | Schutz | 263—2 |
| 2,376,655 | 5/45 | Brotz | 263—2 |
| 2,523,015 | 9/50 | Greiner | 65—281 XR |
| 2,525,285 | 10/50 | Collins | 18—19 |
| 2,571,416 | 10/51 | Brown | 18—19 |
| 2,794,212 | 6/57 | Warsack | 18—6 |
| 2,883,702 | 4/59 | Van Riper | 18—6 |
| 2,991,501 | 7/61 | Ramsey | 18—6 |
| 3,016,571 | 1/62 | Adams | 18—19 |
| 3,079,637 | 3/63 | Marzillier | 18—19 |

WILLIAM J. STEPHENSON, *Primary Examiner.*